United States Patent [19]

Röling

[11] Patent Number: 4,458,959
[45] Date of Patent: Jul. 10, 1984

[54] LIGHT-WEIGHT LARGE-DIAMETER ANTIFRICTION BEARING

[75] Inventor: Horst Röling, Hamm, Fed. Rep. of Germany

[73] Assignee: Estel Hoesch Werke Aktiengesellschaft, Dortmund, Fed. Rep. of Germany

[21] Appl. No.: 507,682

[22] Filed: Jun. 27, 1983

Related U.S. Application Data

[63] Continuation of Ser. No. 256,489, Apr. 22, 1981, abandoned.

[30] Foreign Application Priority Data

Jun. 13, 1980 [DE] Fed. Rep. of Germany ....... 3022227

[51] Int. Cl.³ .............................................. F16C 33/58
[52] U.S. Cl. .................................... 308/235; 308/216
[58] Field of Search ......... 308/216, 219, 227, 229–235

[56] References Cited

U.S. PATENT DOCUMENTS

| | | | |
|---|---|---|---|
| 1,672,012 | 6/1928 | Tyson | 308/216 X |
| 2,928,698 | 3/1960 | Fieghofen | 308/77 X |
| 3,361,500 | 1/1968 | Pohler | 308/216 |
| 3,404,925 | 10/1968 | Bailey | 308/184 |
| 3,814,488 | 6/1974 | Rood | 308/227 |

FOREIGN PATENT DOCUMENTS 2308826 11/1976 France ............................... 308/216

Primary Examiner—Stuart S. Levy
Assistant Examiner—David Werner
Attorney, Agent, or Firm—Max Fogiel

[57] ABSTRACT

A light-weight large-diameter antifriction bearing is composed of a plurality of bearing rings each of which is in turn composed of rounded hollow profiles which together define the bearing race for the anti-friction rolling elements. Each hollow profile has a circumferentially complete cross section.

6 Claims, 5 Drawing Figures

LIGHT-WEIGHT LARGE-DIAMETER ANTIFRICTION BEARING

This is a continuation, of application Ser. No. 256,489 filed Apr. 22, 1981, now abandoned.

BACKGROUND OF THE INVENTION

The present invention relates to antifriction bearings in general, and to antifriction bearings in particular.

More specifically, the invention relates to a large-diameter light-weight antifriction bearing.

In large-dimensioned antifriction bearings the weight of the bearing is often of critical importance. The large bearing diameter and the large cross section which is necessary to accommodate the roller bodies and for mounting the bearing on its support structure always results in a very sizable weight if the bearing is constructed in conventional manner of massive steel elements. In many instances, however, the use of an antifriction bearing is desired because of the large open space in its center, and in such applications the great weight of the known bearings of this type is often unacceptable. For this reason various proposals have been made for reducing the weight of these bearings so that they can be used in applications where the great weight is not acceptable.

According to German Gebrauchsmuster No. 1,945,404 it has been proposed to make the bearing of sheet metal in order to reduce its weight. Another Gebrauchsmuster No. 1,791,875 has proposed to make the bearing of profile material which is rounded and welded together. These bearings achieve the purpose of reducing the weight of the overall bearing, but have another disadvantage, namely the fact that they have only a very small resistance to torsional twisting and deformation so that peak resistances to the rotation of the antifriction rollers can readily develop.

Another proposal has been made in German Patent No. 1,174,970 which suggests to use bearing rings of synthetic plastic material which is of light weight. Again, the weight of the bearing is reduced but in this case the bearing is of relatively low hardness so that such a bearing can transmit only low forces or, if it is forced to transmit higher forces, has only a short life. It has been proposed to counteract this problem by providing metal inserts in the bearing ring surfaces; However, this requires a very complicated and expensive manufacturing operation and thus makes the overall bearing quite expensive.

SUMMARY OF THE INVENTION

Accordingly, it is a general object of the present invention to overcome the disadvantages of the prior art.

A more particular object of the invention is to provide an improved light-weight large-diameter roller bearing which has good inherent stiffness, i.e. resistance to torsional twisting.

A concomitant object is to provide such a roller bearing which has sufficient strength so as to be able to transmit even relatively high forces and to have a satisfactory working life.

A concomitant object of the invention is to provide a roller bearing of the type in question which can be manufactured in a simple and economical manner.

In pursuance of these objects, and of still others which will become apparent as the invention proceeds, one aspect of the invention resides in a light-weight large-diameter roller bearing which, briefly stated, comprises a plurality of bearing rings together defining a bearing race and being at least in part composed of hollow profiles of circumferentially complete cross section, and a plurality of anti-friction rolling elements received in the bearing race.

It is advantageous if, according to a further concept of the invention, the bearing rings—after rounding and joining of the profiles—have their dimensions and/or cross section adjusted to a desired final value by non-material removing deformation, so whereby a profiling for accommodation of the track to the shape of the roller bodies, can be effected at the same time.

Each bearing ring may be composed of one or more hollow profiles which are circumferentially closed or a hollow profile of at least one of the bearing rings may be replaced by a different component, i.e. a non-hollow profile.

Moreover, the interior of the hollow profiles may be connected with a cooling-fluid or heating-fluid circuit so that the bearing can be cooled or heated as necessary or desired.

The invention will hereafter be described with reference to several exemplary embodiments. It is to be understood, however, that these descriptions are provided for purposes of explanation only and are not to be considered definitive of the invention.

DESCRIPTION OF PREFERRED EMBODIMENTS

Figure 1:
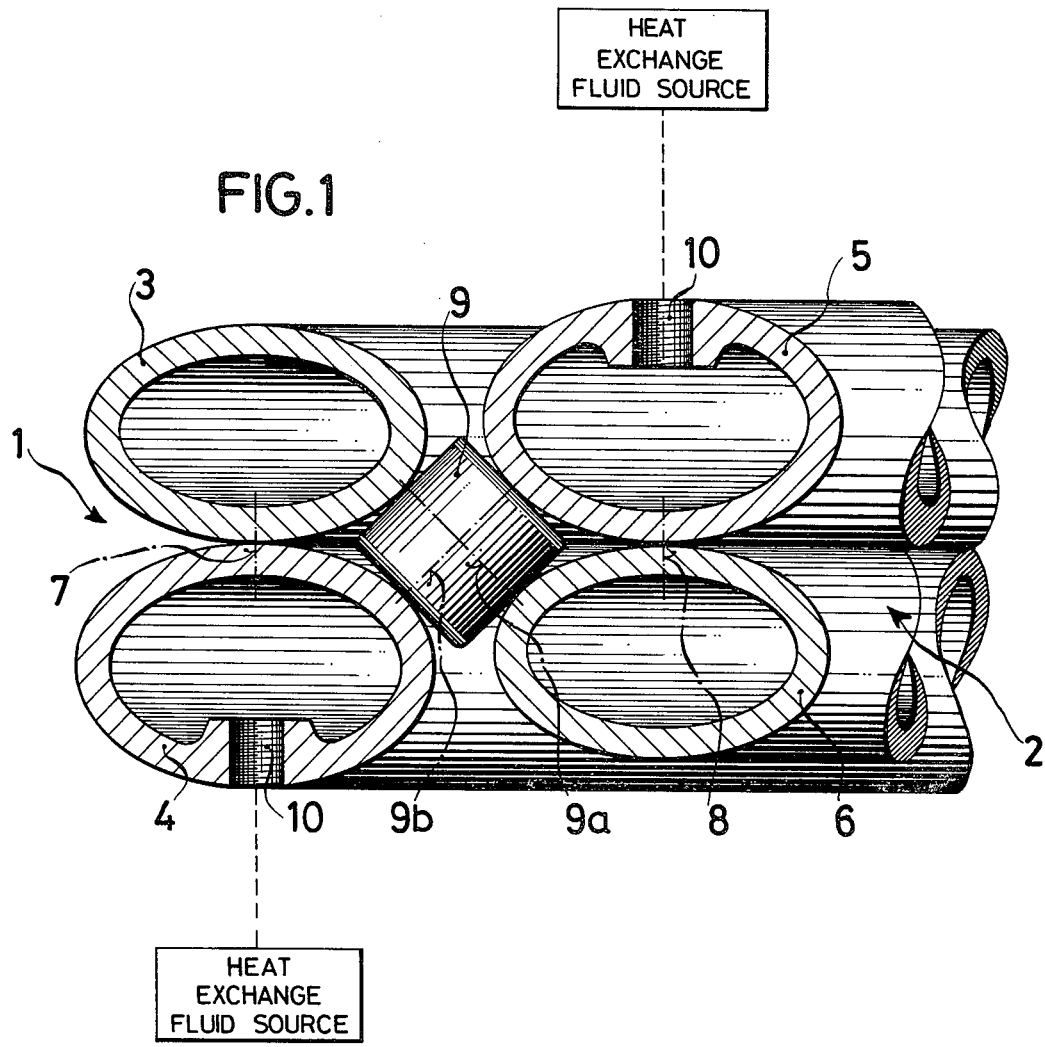
FIG. 1 is a fragmentary cross section through one half of a roller bearing according to the present invention.

Referring now in detail to the drawing it will be seen that in the embodiment of FIG. 1 each bearing ring 1, 2 of the roller bearing is composed of two hollow profiles. The outer bearing ring 1 is composed of an upper hollow profile 3 and a lower hollow profile 4 whereas the inner ring 2 is composed of an upper hollow profile 5 and a lower hollow profile 6. The hollow profiles 3 and 4 which belong together are joined at 7 e.g. for example by screw threading, welding, adhesive bonding, riveting or the like to form the outer ring 1, and a similar connection 8 is made for the associated profiles 5 and 6 which form the ring 2. In the illustrated embodiment the connections 7 and 8 are by screw threading. In the race between the outer ring 1 and the inner ring 2 there is arranged as usual a series of antifriction bodies here in form of antifriction rollers 9. In FIG. 1 these friction rollers are arranged in accordance with the cross-roller system, i.e. the roller 9 which is visible is turnable about an axis 9a whereas a roller which is located behind it and is not visible is turnable about an axis 9b that extends at a 90° angle to the axis 9a, where the third roller (also not visible) again being turnable about an axis 9a, and so on.

The hollow profiles, or at least the hollow profiles 4 and 5 in the embodiment of FIG. 1, may be a source of heat exchange fluid, i.e. heating fluid and/or cooling fluid (diagrammatically shown) by means of bores 10 which may for example be tapped as shown.

Figure 2:
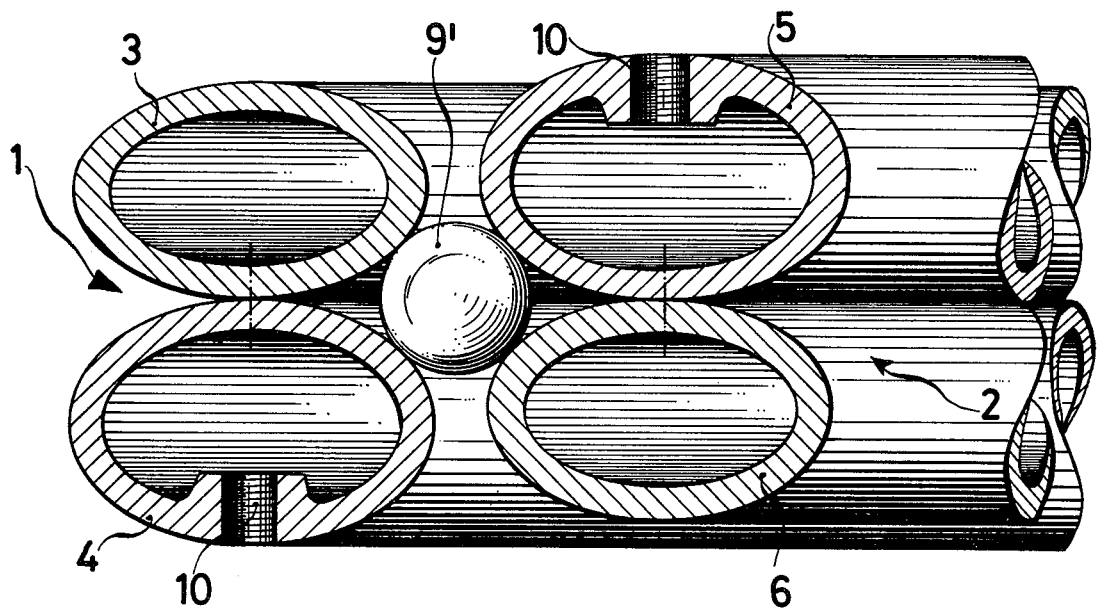
FIG. 2 is a view similar to FIG. 1 but illustrates a somewhat different embodiment.

The embodiment of FIG. 2 is identical in all respects to the embodiment of FIG. 1 expect that the antifriction rollers 9 are here replaced by antifriction bearing balls 9'.

Figure 3:
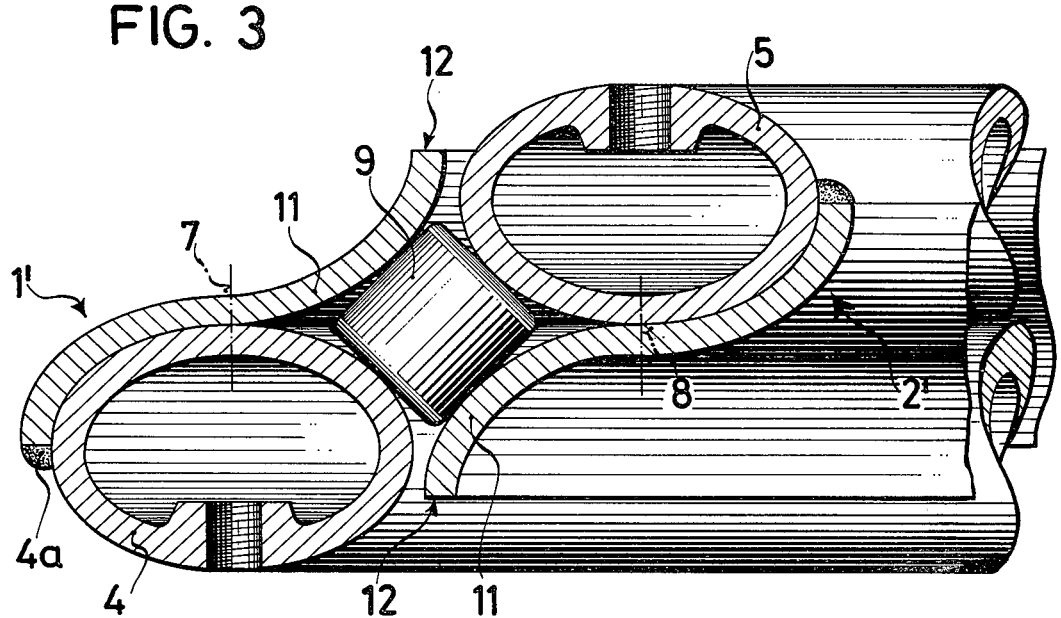
FIG. 3 is another view similar to FIG. 1 illustrating a third embodiment of the invention.

In the embodiment of FIG. 3 like reference numerals are identified with like elements as before. Here, however, the outer ring 1 has only a single hollow profile 4 and the inner ring 2 has only a single hollow profile 5. The hollow profiles which are missing in the case of each of the rings are replaced by a pair of non-hollow profiled members 11, one associated with each of the rings 1 and 2 which are connected (e.g. welded at 4a, 5a) to the profiles 4 and 5, respectively. This embodiment has less resistance to deformation than the embodiments in FIGS. 1 and 2 and is intended for use in applications where only an extremely small amount of space is available for installation of the bearing, since the embodiment of FIG. 3 requires considerably less space than the embodiments of FIGS. 1 and 2 as a quick comparison will readily show. Incidently, the free edges of the members 11 are identified with reference numeral 12 and are very well suited for mounting of not illustrated seals, for example lip seals, to prevent outflow of lubricant and the intrusion of contaminants.

Figure 4:
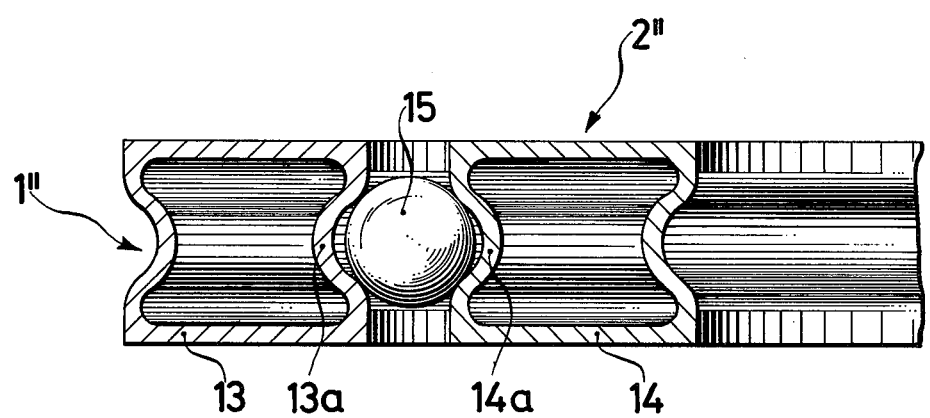
FIG. 4 is a fragmentary section through one bearing half having only one hollow profile each as the bearing ring.

In the embodiment of FIG. 4 the entire bearing again has the outer ring 1 and the inner ring 2 but each of the rings in configurated of a single annular hollow profile 13 and 14, respectively, whose inner facing side walls 13a and 14a are suitably deformed so as to form a race for the rolling elements 15.

Figure 5:
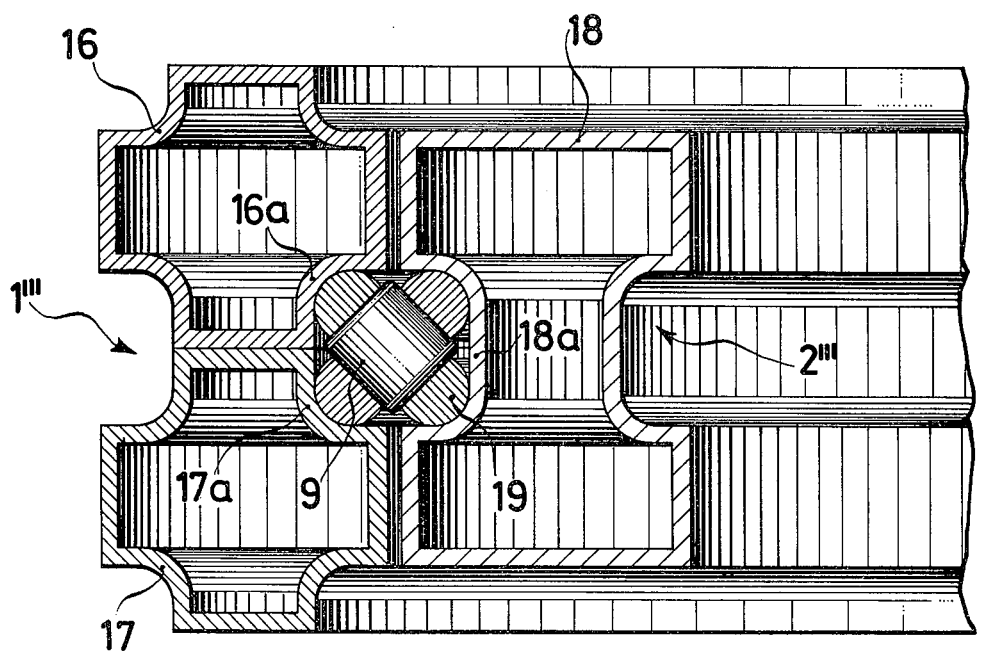
FIG. 5 is a fragmentary cross section through one bearing half of still another embodiment according to the invention.

In the embodiment of FIG. 5, finally, the inner ring 2 and the outer ring 1 are again provided as before. The outer ring 1 is composed of two hollow profiles 16 and 17 which are again annular as always in all embodiments, and the inner ring 2 is composed of a single annular hollow profile 18. Incidently, in all embodiments the hollow profiles are always of circumferentially complete cross section. In FIG. 5 the portions 16a, 17a and 18a which are shaped to form the race for the antifriction bearing elements 9 (here in form of a crossroller system as described with reference to FIG. 1) define between themselves a space large enough for the installation of known bearing wires 19 on which the rolling elements 9 actually roll. The use of such bearing wires is known per se and therefore requires no detailed discussion. The ability to withstand forces and the service life of the bearing in FIG. 5 is increased by this construction.

Ordinarily, the hollow profiles will be circumferentially complete and their ends will be suitably joined, for example by welding or the like. However, in special applications the joint may not be permanent but instead can be held together by appropriate connecting means, for example screws or the like.

Among the advantages of the bearing according to the present invention is the fact that it can be constructed to very large dimensions and will yet be light in weight, but it nevertheless has adequate resistance to twisting and other deformation and that its race track is sturdy. The production of the bearing is inexpensive and involves very little waste material so that the bearing is economical. Moreover, by the use of appropriate material the bearing according to the present invention can be readily employed in aggressive surroundings, i.e. it can be made corrosion resistant with relatively little effort.

The invention has hereinbefore been described with reference to several exemplary embodiments which are, however, intended only for the purpose of explaining the invention and are not to be considered limiting in any sense. The scope of the invention and the protection sought for it are defined exclusively in the appended claims.

What is claimed is:

1. Light-weight large-diameter antifriction bearing, comprising a plurality of bearing rings together defining a bearing race being at least in part composed of completely closed and seamless rounded hollow pofiles of circumferentially complete cross section; and a plurality of anti-friction rolling elements received in said bearing race, said hollow profiles being integral members and extending over the entire cross section and having continuous surfaces, said hollow profiles contacting said rolling elements only at a point so that said bearing rings have substantially low deformation, deformation of said bearing rings being independent of resistance against rotation, said bearing rings being of symmetrical constructions for maintaining uniform running of the bearing rings upon inclined loading of the bearing by substantially uniform resistance torques of said bearing rings, said bearing being connectable at predetermined points to a load for assuming entirely by itself load transmission function independent of shaft seats and shaft supports.

2. Bearing as defined in claim 1, wherein at least one of the cross section and dimensions of each of said bearing rings is adjusted to a final desired value by deformation of the ring without removal of material.

3. Bearing as defined in claim 1, wherein each of said bearing rings is composed of at least one of said hollow profiles.

4. Bearing as defined in claim 1, wherein each of said bearing rings is composed of a plurality of said hollow profiles.

5. Bearing as defined in claim 1, wherein at least one of said bearing rings is composed of a hollow profile and the other of a solid cross-section profile.

6. Bearing as defined in claim 1; and further comprising means for connecting the interior of said hollow profiles with a source of heat-exchange fluid.

* * * * *